Nov. 7, 1967  B. SASSEN ET AL  3,351,217
APPARATUS FOR HANDLING ARTICLES
Original Filed April 27, 1962  8 Sheets-Sheet 5

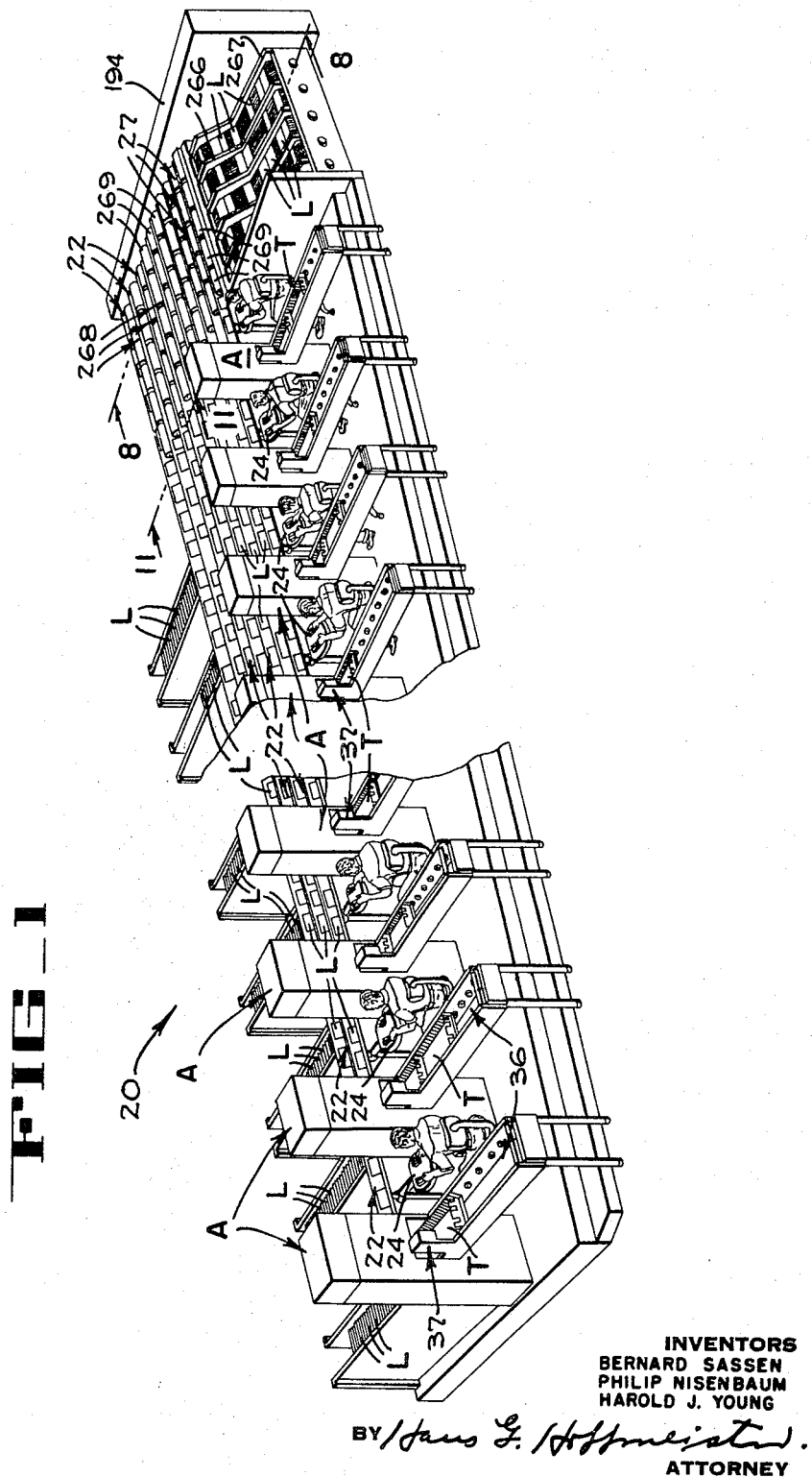

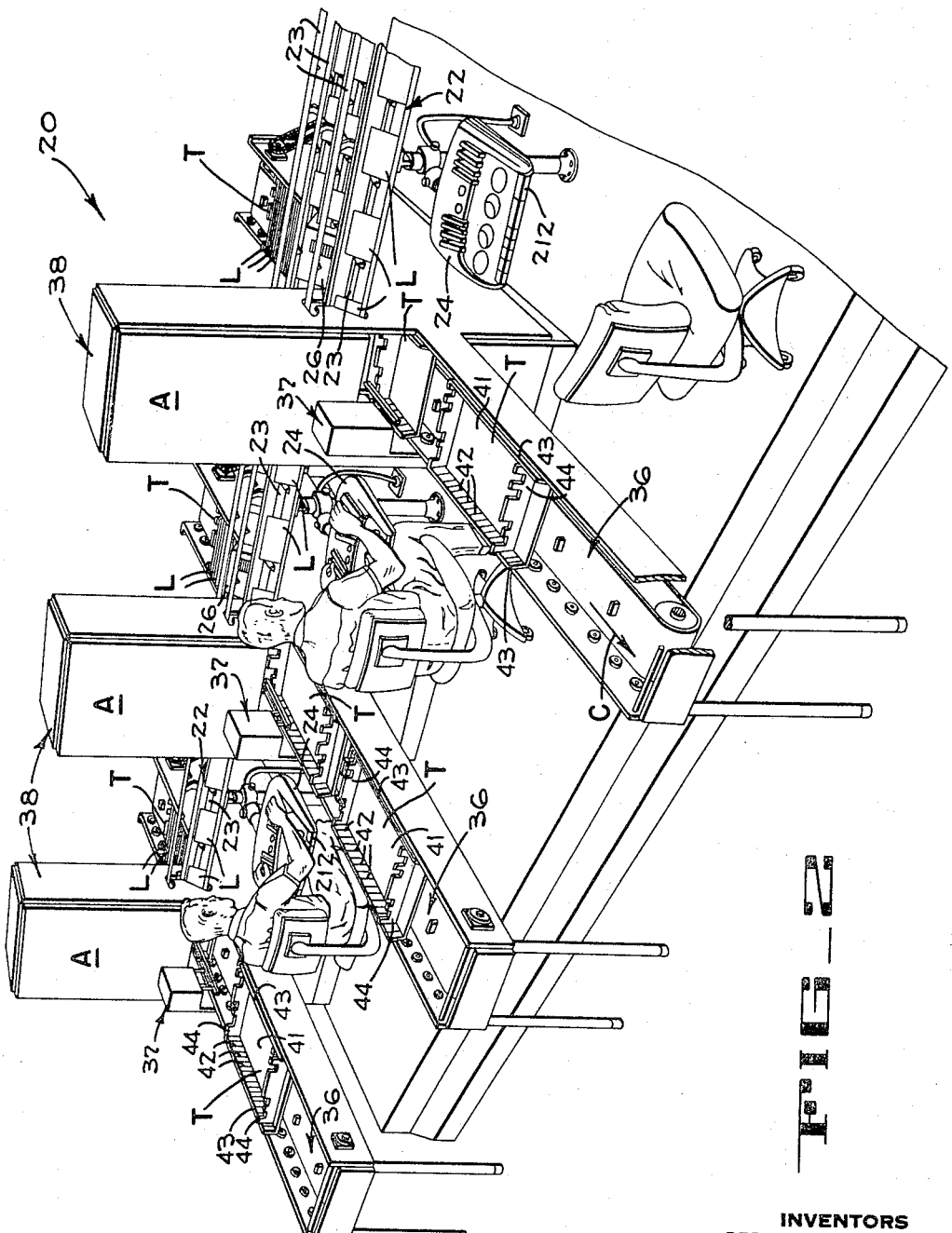

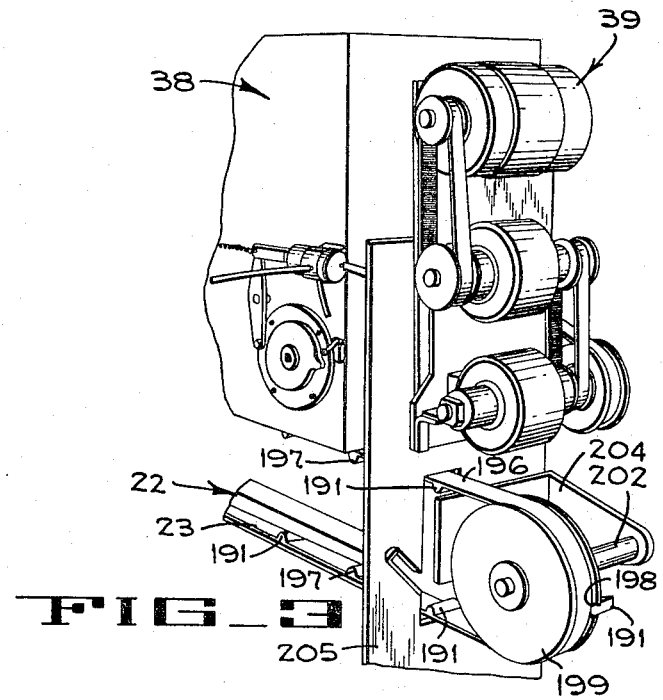

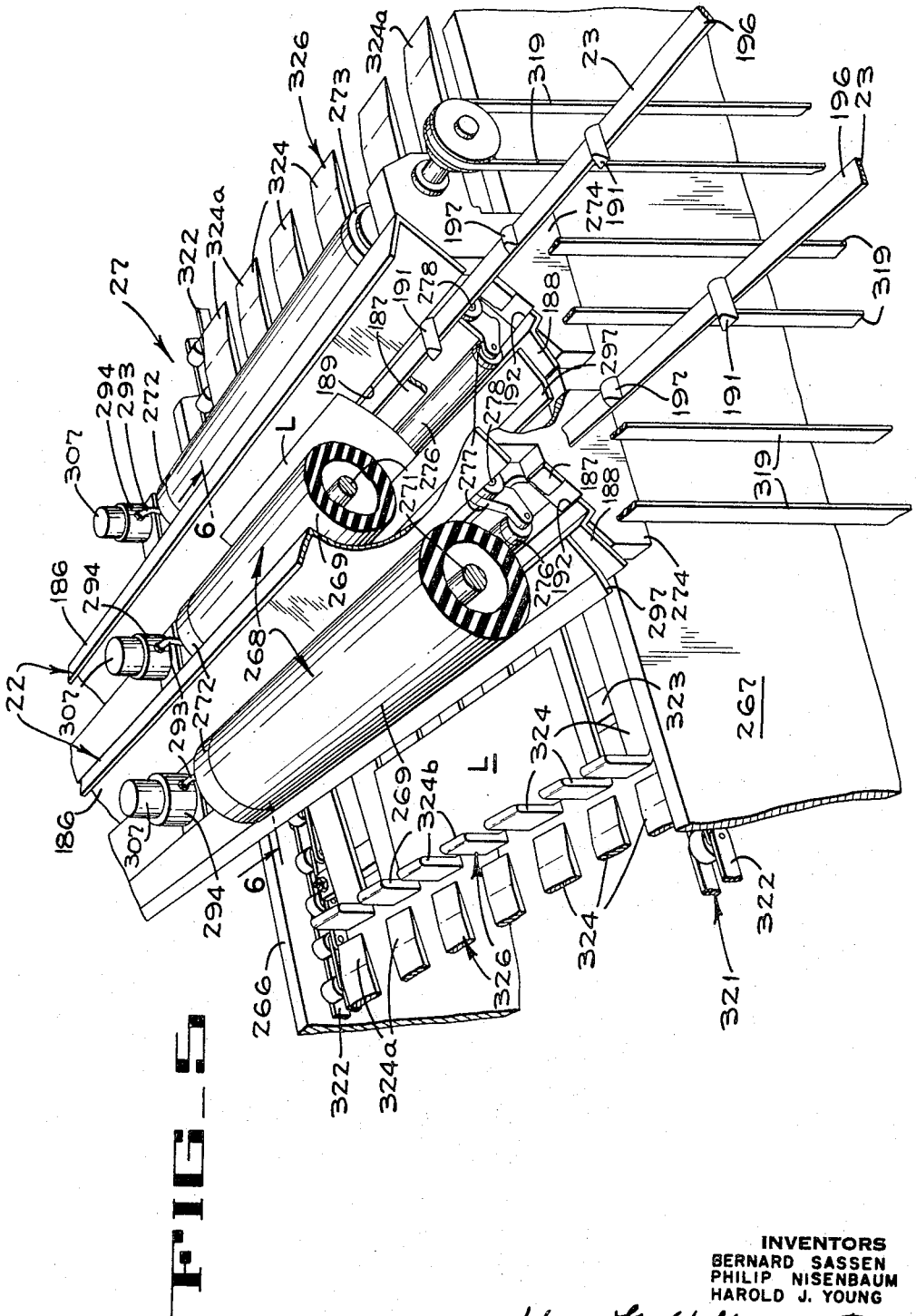

INVENTORS
BERNARD SASSEN
PHILIP NISENBAUM
HAROLD J. YOUNG
BY *Hans G. Hofmeister*
ATTORNEY

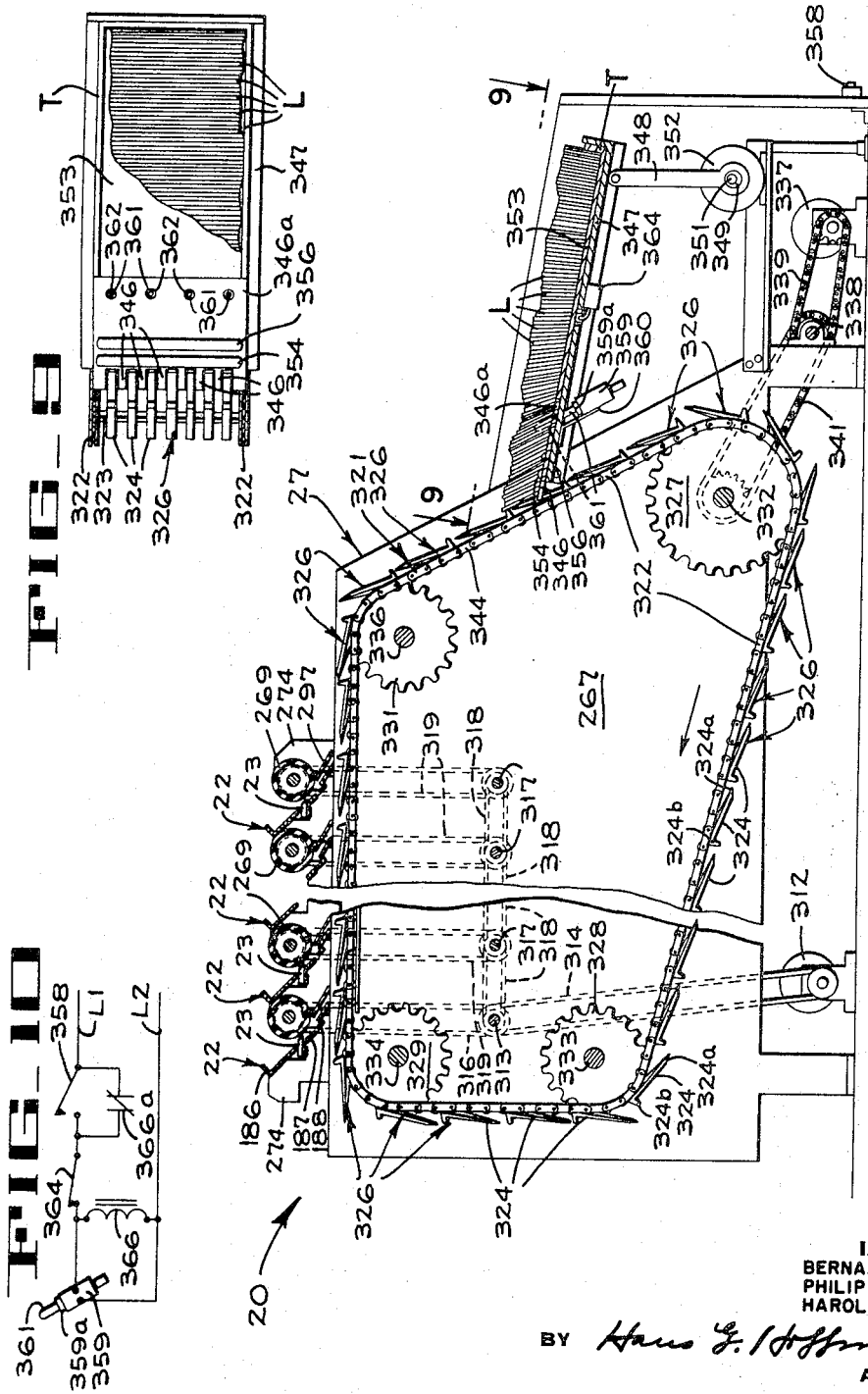

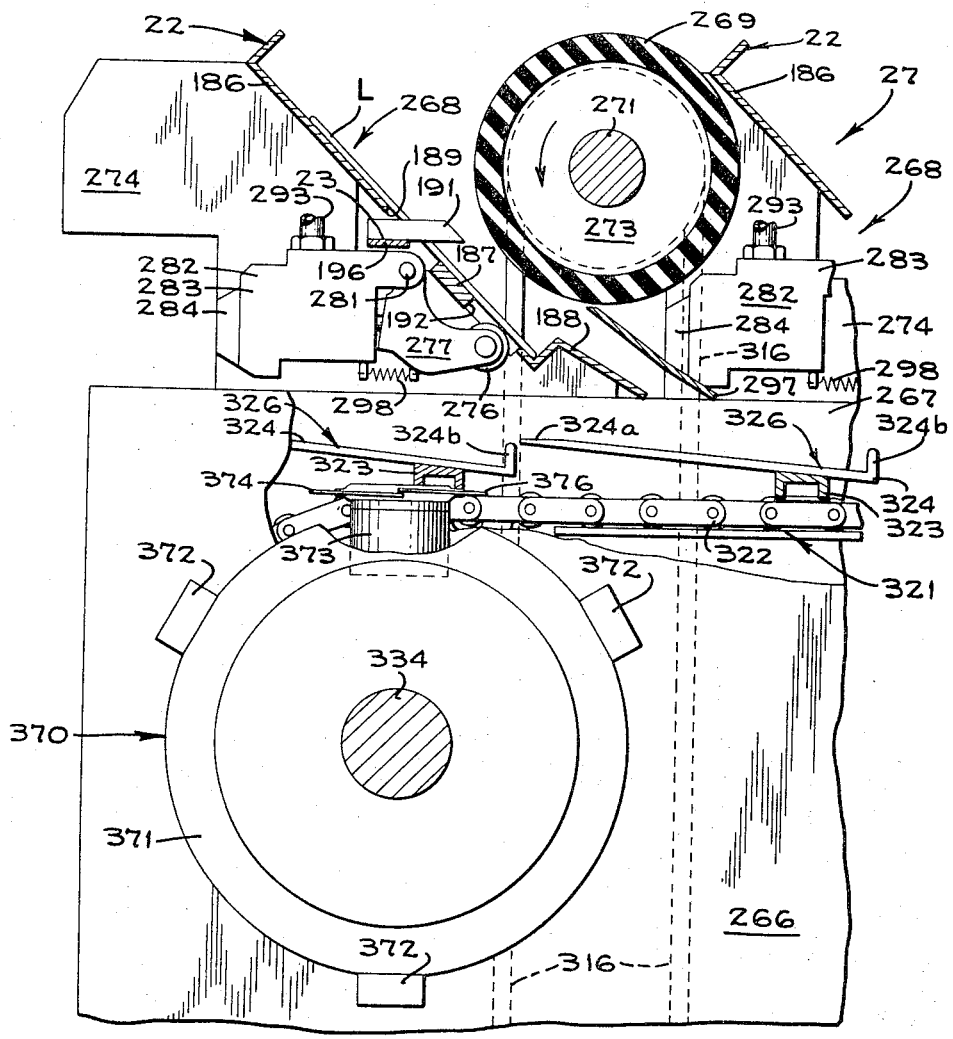
FIG_11
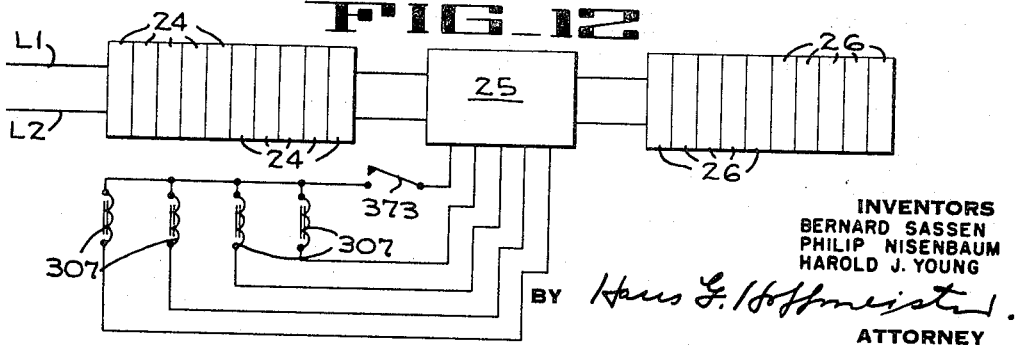
FIG_12
INVENTORS
BERNARD SASSEN
PHILIP NISENBAUM
HAROLD J. YOUNG
BY *Hans F. Hoffmeister*
ATTORNEY

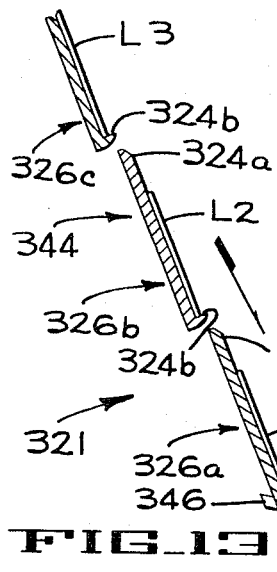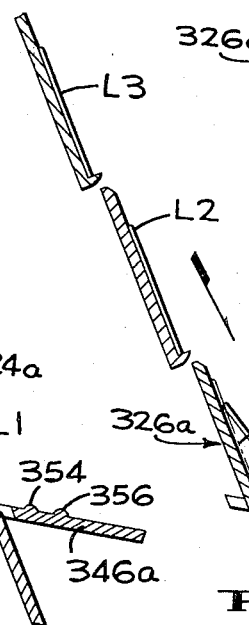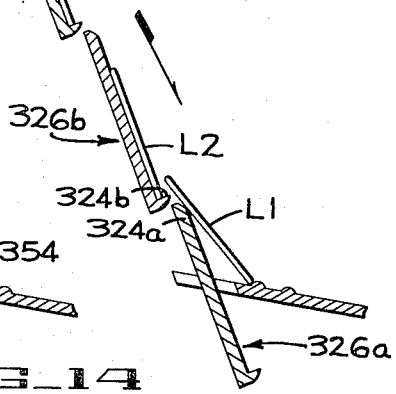

3,351,217
APPARATUS FOR HANDLING ARTICLES
Bernard Sassen, Victoria, British Columbia, Canada, and Philip Nisenbaum and Harold J. Young, San Jose, Calif., assignors to FMC Corporation, San Jose, Calif., a corporation of Delaware
Continuation of application Ser. No. 433,834, Jan. 25, 1965, which is a division of application Ser. No. 190,550, Apr. 27, 1962, now Patent No. 3,219,204, dated Nov. 23, 1965. This application Apr. 4, 1966, Ser. No. 552,993
9 Claims. (Cl. 214—7)

The present invention relates to a system for handling thin, flat articles such as letters or the like, and more particularly relates to an apparatus for sorting such articles into a plurality of classes or groups, and stacking the sorted articles.

This application is a continuation of our copending application, Ser. No. 433,834 (now abandoned), filed Jan. 25, 1965, and assigned to the assignee of the present invention. The latter application is a division of our copending parent application, Ser. No. 190,550, filed on Apr. 27, 1962, (now Patent 3,219,204, issued on Nov. 23, 1965) and is also assigned to the assignee of the present invention.

The present invention will be described with reference to a system for sorting and stacking letters in a Post Office installation.

In a system embodying the present invention, a number of transport or sorting conveyors run side by side from address reading and coding stations, and all transport conveyors cross a series of stacking conveyors. Letters from any transport conveyor are transferred to any stacking conveyor by code-controlled kick-off mechanisms. Letters on each stacking conveyor are stacked into a tray at one side of the lines of transport conveyors. This means that letters from the far side transport conveyors must cross beneath all transport conveyors before being stacked in a tray. The transport conveyors will usually lie in common horizontal plane, so that the letter receiving run of each stacker conveyor is generally horizontal. The problem is to selectively transfer letters from any transport conveyor to any stacker conveyor, and to shingle the letters off one by one from each stacker conveyor to a stack-forming platform, which preferably includes a removable tray.

As mentioned, under the present invention, the stacker conveyors have a run that crosses beneath the transport or sorting conveyors for receiving letters from the latter in accordance with their assigned designation, namely, one of the stacker conveyors. Each stacker conveyor can transfer all of its letters to a tray or a platform, (which is downwardly inclined), because the stacker conveyors have downwardly inclined runs at the trays or platforms, and means are provided for causing transfer of the letters from the downwardly inclined runs to the platforms in a shingled manner, one by one, to form a stack on each platform.

It is an object of the invention to provide apparatus that handles thin, flat articles such as letters or the like, in the manner described above.

Another object of the invention is to facilitate the shingling type transfer of the articles one by one, from a downwardly running conveyor to a stacking platform. In the present invention the transfer is effected by interdigitated means at the transfer zone, to provide a combing action.

It is also an object to provide a stacking platform of the type described, which provides operator-controlled abutments for permitting a partial stack of articles to accumulate while the trays are removed.

It is also an object to synchronize the transfer of articles from the transport to the stacker conveyors, in order that the articles will be accurately placed into buckets on the stacker conveyors.

In the drawings:

FIG. 1 is a fragmentary diagrammatic perspective of a reading, coding and presorting apparatus of a letter handling system embodying the present invention, certain parts being removed.

FIG. 2 is an enlarged, fragmentary, diagrammatic perspective showing the left end of the coding and presorting apparatus of FIG. 1 in greater detail.

FIG. 3 is a fragmentary diagrammatic perspective illustrating the idler pulley of one of the letter transporting conveyors of the reading, coding and presorting apparatus.

FIG. 4 is a perspective showing one of the drive mechanisms for the letter transporting conveyors.

FIG. 5 is an enlarged perspective of a fragment of the letter transfer device, certain parts being cut away and other parts being shown in section.

FIG. 6 is an enlarged schematic section taken along line 6—6 of FIG. 5.

FIG. 7 is a schematic section of a solenoid operated valve for controlling the kick-off roller of one of the kick-off devices.

FIG. 8 is a schematic vertical section taken through line 8—8 of FIG. 1 showing one of the letter transfer and stacking mechanisms.

FIG. 9 is a schematic plan of a portion of the letter transfer and stacking mechanism looking in the direction of the arrow 9—9 of FIG. 8.

FIG. 10 is a wiring diagram of a circuit for controlling the portion of the letter transfer and stacking mechanism shown in FIGURE 9.

FIG. 11 is an enlarged schematic vertical section taken substantially along the line 11—11 of FIG. 1 showing the upper left portion of the letter stacking and transfer mechanism of FIG. 8 with a timing device associated therewith.

FIG. 12 is a diagram illustrating the operation of the timing device shown in FIGURE 11 and its association with other parts of the reading, coding and presorting apparatus.

FIGURES 13–18 are schematic operational diagrams of the shingling and stacking mechanism.

The embodiment to be described is a letter handling system which includes a reading, coding and presorting apparatus 20 (FIG. 1). In a Post Office, there may also be a decoding and letter sorting apparatus (not shown) which is adapted to receive mail that has been processed in apparatus 20.

The reading, coding and presorting apparatus 20 (FIGS. 1 and 2) includes a plurality of coding stations A, ten stations being provided in the illustrated embodiment of the invention. Trays T of letters L are fed into each coding station A and the letters are automatically placed one at a time on the inclined easel 22, there being one easel associated with each station and extending from that station to the discharge end of the machine. An operator at each station A reads the address on the letters L, as they are moved along the easel 22 by a letter transporting conveyor 23. The operator controls a keyboard 24 (FIG. 2) that causes a coded marking to be imprinted on each letter by a printing unit 26, and also causes a signal to be placed into an electronic directory and memory unit 25 (illustrated diagrammatically in FIG. 12) which effects a presorting of each letter, causing the letters to subsequently be placed into any one of a plurality of letter transfer and stacking mechanisms 27. One of the high speed letter-transporting conveyors 23 is associated with each coding station A, and extends from that particular station to the mechanisms 27. In the system illustrated, each conveyor 23 is intermittently indexed by the operator to advance each letter along the easel 22 and eventually on to a particular conveyor in the stacking mechanism 27. Each letter transfer and stacking mechanism 27 automatically discharges selected letters from the transport conveyors 23 and stacks them into removable trays.

More particularly, in the system described, the reading, coding and presorting apparatus 20 (FIG. 2) includes, at each coding station A, a tray conveyor 36, an incremental drive mechanism 37 for advancing the tray conveyor 36 in increments equal to the thickness of the letters being removed therefrom, and a letter singulator 38 and its drive mechanism 39 (FIG. 3). The details of the components at each coding station have been fully disclosed in the aforementioned parent application and will not be repeated herein.

As best shown in FIG. 2, each tray T comprises an open-ended generally U-shaped body 41 having a plurality of vertical grooves 42 in each vertical side wall 43. Two removable end plates 44 are each placed in aligned grooves 42 in the walls 43 and are spaced apart a distance sufficient to support the letters thereon in substantially vertical planes parallel to the end plates 44.

One of the easels 22 is associated with each station A and extends from its station A past all of the letter transfer and stacking mechanisms 27 (FIG. 1). The easel receives the letters from its associated singulator 38 and supports the letters for intermittent movement past the reading and coding operator. The easel 22 (FIGS. 6 and 11) is inclined forty-five degrees away from the operator to aid the operator in reading the letters, and is preferably formed of three elongated pieces, an upper L-shaped guide 186, an intermediate guide plate 187, and a lower S-shaped guide 188. An elongated slot 189 is defined between the guide 186 and plate 187 and receives letter-propelling lugs 191 of the associated letter transporting conveyor 23. A similar slot 192 is formed between the plate 187 and the S-shaped guide 188 and receives therein a portion of the letter transfer and stacking mechanism 27.

Each letter transporting conveyor 23 extends from its associated station A to a drive housing 194 (FIG. 1) at the far right of the apparatus 20. The conveyors 23 are identical except for their length and each includes an endless steel tape 196 (FIG. 5) which has a plurality of the equally spaced letter propelling lugs 191 secured to its inner surface. A plurality of short tape drive lugs 197 are secured to the tape between the lugs 191. The lugs 191 and 197 are received in cavities 198 in an idler pulley 199 at one end of the tape, and in cavities 198a in a drive pulley 201 (FIG. 4) at the other end of the tape. The idler pulley 199 and drive pulley 201 are keyed to shafts 202 and 203, respectively. The shaft 202 is journalled in a bracket 204 that is bolted to an upstanding member 205 of the frame of the machine which in turn is connected to the housing 106 of the associated station A. Similarly, the shaft 203 is journalled in a bracket 206 that is bolted on the housing 194 (FIG. 1).

The drive lugs 191 on tape 196 are preferably spaced approximately fourteen inches apart so as to accommodate standard size letters. The lower run of the tape 196 is disposed adjacent the slot 189 (FIG. 6) so that the letter drive lugs 191 project through the slot 189 in position to engage and drive the letters L toward the right, as viewed in FIGURE 1.

In the system described, each of the conveyors 23 is intermittently driven by a drive mechanism 211 (FIG. 4), which is activated by the associated operator upon actuation of a spacer bar switch 212 (FIG. 2), after he has finished reading the address on the letter and has operated the keyboard to subsequently cause the appropriate code markings to be placed on the letters by the printing unit 26. The maximum rate at which the letters can be driven by each conveyor is four letters per second.

The drive mechanism 211 (FIG. 4) for each conveyor 23 includes a continuously driven motor 213 (FIG. 12) that is connected to a clutch 214 by a belt drive 216. The clutch 214 may be of the type known as a particle clutch, wherein small steel particles are magnetically solidified to connect a drive member to a driven member. The particle clutch 214 is connected to a particle brake 217 by a belt drive 218. The particle brake 217 is connected to the drive shaft 203 by a belt drive 219 which includes a pulley 221 keyed to the shaft 203.

Each letter transport conveyor 23 (FIG. 3) and its associated singulator 38 are operated at a pace set by the operator assigned to that station A. Any suitable control circuit, such as a circuit disclosed in the aforesaid parent application, is provided to control the timed actuation of the conveyor 23 and singulator 38 upon closing of the spacer bar switch 212.

Energization of the clutch 214 causes the drive shaft 203 (FIG. 4) to be rotated through 180° to advance its conveyor fourteen inches. After the shaft 203 has rotated 180°, one of two diametrically opposed pins 229 (FIG. 4) on the drive pulley 201 contacts and momentarily opens a normally closed timing switch 224. Opening of the switch 224 causes energization of the brake 217 and de-energization of the clutch 214. It will be understood that the brake 217 does not stop the shaft 203 abruptly, but permits the shaft to rotate several degrees before bringing it to a gradual stop. Thus, the pin 229 advances past the switch 224, and permits the switch to return to its normally closed position.

As best shown in FIGURE 2, each operator controls the movement of one of the letter transporting conveyors 23 by means of the spacer bar switch 212 at a pace determined by that particular operator. At least two letters are within the range of vision of each operator to aid in his rapid reading of the address of each letter in turn. Upon reading the address on each letter the operator operates the proper keys on the keyboard to transmit certain coded information to the memory unit 25 (FIG. 12) and to the associated printing unit 26 which subsequently prints the code markings on the letter. The operator also actuates one of five keys which transmits a signal through the memory unit 25 to one of five letter transmitting and stacking mechanisms 27 (FIG. 1) which subsequently removes each letter from its easel 22 and stacks the letter with other letters in its particular classification or group.

The letter transfer and stacking mechanisms 27 (FIGS. 5 to 11) of the present invention are identical, therefore, the description of one will suffice for all.

Each kick-off device 268 (FIGS. 5 and 6) includes a resilient transfer roller 269 which is secured to a shaft 271 by end caps 272 and 273 (FIG. 5). The shaft 271 is continuously driven in a counterclockwise direction (FIG. 6) and is journalled in brackets 274 (only one being shown in FIG. 5). An elongate kick-off roller 276, which extends substantially the full length of the roller 269, is journalled on a rigid carrier 277 which is pivotally mounted at one end on a pin 278 (FIG. 5) and at the other end by a pin 281 (FIG. 11). The pins 278 and 281 are each secured to the housing 282 of one of two identical air cylinders 283 that are supported by the adjacent brackets 274.

The rearward end of each housing 282 is closed by a plate 284 (FIG. 6). A piston 285 is slidably received in the housing 282 and has a reduced diameter central portion 286 having a diametrical passage 287 extending therethrough. An axially extending passage 288 communicates with the passage 287 and projects through the end of the piston 285 adjacent the closure plate 284. A bore 289 in the forward end of the piston 285 receives one end of a pin 291. The other end of the pin 291 is received in a cavity 292 formed in the carrier 277. An air supply conduit 293 is connected between a solenoid operated air valve 294 and a part 296 in the housing 282 which port 296 communicates with the reduced diameter portion 286 of the piston 285. The air cylinder 283 is suitably supported by the wall 266. An elongated, inclined letter guide plate 297 cooperates with the S-shaped guide 188 of the easel 22 to control the discharge of letters from the easel 22.

Each carrier 277 and its kick-off roller 276 are normally held in a retracted position below the letter supporting surface of the easel 22 as indicated at the left in FIG. 6 by springs 298 connected between the carrier 277 and the housings 282 of the adjacent air cylinder 283. When high pressure air is directed into the air cylinder 283, the roller 276 is moved through the slot 192 in the easel 22, as indicated at the right in FIG. 6, thereby forcing the letter L against the continuously moving roller 269 causing the letter to be discharged between the guide plate 297 and the S-shaped guide 188 of the easel 22.

The solenoid operated valve 294 (FIG. 7) comprises a body 301 having a slidable core 302 therein. The core 302 is normally held in the inactivated position shown in FIG. 7 by a spring 303. When in the inactivated position, the conduit 293 is vented to the atmosphere through a passage 304 in the core 302 which registers with the conduit 293 and with a port 306. The core 302 is connected to a solenoid 307 which moves the core 302 to the left when energized so that an inclined passage 308 in the core 302 will register with the conduit 293 and with a conduit 309. The conduit 309 is connected to a source of air under pressure. Thus, when the solenoid 307 is energized, high pressure air is directed into the air cylinder 283 thereby forcing the kick-off roller 276 against the letter L and the letter L against the continuously driven roller 269 which discharges the letter from the easel 22.

As indicated in FIGURE 8, the rollers 269 of the kick-off devices 268 are driven by a motor 312. The motor 312 is connected to a main line shaft 313 by a belt drive 314. The main line shaft 313 is arranged to drive all the rollers 269 associated with the longest letter transporting conveyor 23 shown in FIGURE 1 by means of one or more belt drives 316 (FIG. 5). Other line shafts 317 are provided for driving all the rollers 269 associated with the other letter transporting conveyors 23. The line shafts 313 and 317 are interconnected by belt drives 318 and each line shaft 317 is connected to its group of rollers 269 by one or more belt drives 319. It will be understood that the motor 312 is disposed within the housing 194 (FIG. 1) and that the line shafts 313 and 317 are suitably journalled and extend transversely through all the letter transfer and stacking mechanisms 27. The shafts 271 upon which the rollers 269 are secured, may be long shafts extending through all the transfer mechanism 27, in which case only one belt drive 316 or 319 is required for each line shaft. If it be desired that the shafts 271 extend across only one of the mechanisms 27, then several belt drives 316 or 319 will be required for each line shaft.

Upon receipt of a signal from the memory device 25, the solenoid valve 294 (FIG. 5) actuates the associated kick-off rollers 276 and transfers the letter from the easel 22 to the stacking conveyor 321 of the associated letter transfer and stacking mechanism 27.

As mentioned previously, each mechanism 27 is separated from its adjacent mechanism by walls 266 and 267. Accordingly, these walls serve to guide each stacking conveyor 321 along its path of movement indicated in FIG. 8. Each conveyor 321 comprises two parallel endless chains 322 (FIG. 5) having a plurality of evenly spaced transversely extending bars 323 secured therebetween. Each bar 323 supports a plurality of spaced L-shaped strips or fingers 324 which cooperate to define a letter carrying bucket 326. As best shown in FIGURE 6, the trailing edges 324a of the finger 324 which define one bucket 326 extend outwardly further from the chains 322 than do the hooked ends 324b of the fingers 324.

The chains 322 of each stacking conveyor 321 are trained around pairs of sprockets 327, 328, 329 and 331, only one sprocket of each pair being shown in FIGURE 8. The pairs of sprockets 327, 328, 329 and 331 are keyed on shafts 332, 333, 334 and 336, respectively, which shafts are suitably journalled in the walls 266 and 267. The shafts 332, 333, 334, and 336 are preferably long enough to extend through all the letter transfer and stacking mechanisms 27. It should be understood, however, that separate short shafts for each mechanism 27 may be used if desired.

The stacking conveyor 321 of each letter transfer and stacking mechanism 27 is continuously driven by a motor 337 which is connected to a line shaft 338 journalled on the frame of the apparatus 20 by a chain drive 339. The line shaft 338 is connected to the shaft 332 by a chain drive 341 which drives the conveyors 321 in the direction of the arrow in FIGURE 8 and at a rate of approximately twenty-eight inches per second.

The buckets 326 of each conveyor 321 receive one or more letters from the kick-off devices 268 associated therewith and move the letters down a downwardly inclined run 344 of the conveyor 321. The hooked ends 324b which are substantially normal to the conveyor path, serve as ledges to support the letters on the run 344, FIGURES 8 and 13–18. The buckets 326 are mounted on the chains 322 in a manner which cause the conveyor to be articulated at the buckets. The letters are combed out of the buckets 326 by fingers 346 (FIGS. 8 and 9) which project between the strips or fingers 324 which form the buckets 326. The fingers 346 are formed on the forward end of a plate 346a which is secured to a tray supporting frame 347 which is pivotally connected at one end to the adjacent walls 266 and 267.

The trailing edges 324a of the buckets are disposed relative to the terminal edges of the ledges 324b so that the letters L do not hang up on the ledges as the latter move down along the letters when the latter are standing on the fingers 346. As mentioned, and as best seen in FIGURE 11, the edges 324a are outward of the ledges 324b sufficiently to accomplish this. It will be noted that the major portions of the strips or fingers 346 are inclined toward the conveyor path in the direction of conveyor travel, which brings the ends 324a into the geometrical relation with the ledges 324b, just described.

The other end of the frame 347 is pivotally supported by a crank arm 348 which is journalled on an eccentric 349 keyed to the drive shaft 351 of a motor 352. The motor 352 is continuously driven at approximately 1750 revolutions per minute and the eccentric 349 causes the discharge end of the frame 347 to vibrate at an amplitude of approximately $\frac{1}{16}$ of an inch.

A tray T with its forward end plate removed is placed on the frame 347 with the upper surface of its floor 353 disposed even with or slightly below the rear end of the plate 346a so that the letter may slide into the tray T. The frame 347 is so constructed that one side edge of the tray is lower than the other side edge. Accordingly, all the letters will gravitate to the low side so that one side edge and the bottom edge of each letter will be in common planes with the corresponding side edges and bottom edges of all other letters.

In order to prevent the letters from falling flat onto the plate 346a and skidding to the closed end of the tray T, immediately after they have been combed from the buckets 326, shallow abutment strips 354 and 356 (FIG. 9) are secured to the upper surface of the plate 346a. The strips 354 and 356 hold the letters substantially upright, and the letters accumulating rearwardly of the strips will gradually force the forward letters over the strips 354 and 356. The slowly advancing letters then tend to flatten to some extent but the inclination of the frame platform 347 is insufficient to cause them to lose their shingled or overlapping relationship. As the tray T fills, the letters are moved to a more nearly vertical position, as indicated in FIGURE 8.

When the tray has been filled, an operator closes a switch 358 to energize a solenoid 359 which is secured to a bracket 360 secured to the frame 347. A plurality of fingers 361, carried by the actuating element 359a of the solenoid 359, are moved upwardly through openings 362 in the plate 346a when the solenoid 359 is energized. The fingers 361 project upwardly between the letters being stacked, to act as abutments which prevent incoming letters from moving downstream of the fingers 361. The operator then collects all the letters downstream of the fingers 361 and moves them into the tray T and thereafter inserts the other end plate into the tray. The operator then removes the filled tray from the frame 347 and places an empty tray thereon, thereby actuating a switch 364 which de-energizes the solenoid 359.

As shown in FIGURE 10, the solenoid 359 is connected in series with the switches 364 and 358 to main lines L1 and L2. The switch 358 is of a ratchet operated type which is normally closed and is momentarily opened only when its actuating element is being moved downwardly between an upper position when not contacting a tray to the lower position shown in FIGURE 8. When the operator closes the switch 358 the solenoid 359 and a relay 366 are energized. The energization of the relay 366 establishes a holding circuit across the switch 358 by closing relay contact 366a. The solenoid 359 and relay 366 are de-energized by momentary opening of the switch 364 in response to the placement of an empty tray on the actuating element of the switch 364. De-energization of the relay momentarily opens the relay contact 366a thereby breaking the holding circuit.

In the system disclosed, since the reading, coding and presorting apparatus 20 (FIG. 1) is operator-paced, i.e., since each coding operator controls the actuation of his letter transporting conveyor 23 independently of the other operators, and since the letters from all the operators are kicked-off onto continuously driven stacking conveyors common to all the operators, a timing device 370 (FIG. 11) is provided to assure that the letters are kicked-off at the proper instant.

The timing device 370 comprises a disc 371 secured to the shaft 334 of the stacking conveyors 321. Three permanent magnets 372 are secured at evenly spaced intervals to the periphery of the disc 371. A reed switch 373 is positioned closely adjacent the path of movement of the magnets and includes a stationary contact 374 and a movable ferrous contact 376. The magnets 372 are oriented relative to the buckets 326 of the stacking conveyors 321 so that one of the magnets 372 moves past the switch 373, thereby moving the contact 376 against the contact 374, at the precise moment the kick-off rollers 276 of the several kick-off devices 268 should be actuated. The reed switch 373 (FIG. 12) is placed in series with all the solenoids 307 (only four being shown in FIG. 11) which causes actuation of the kick-off rollers 376.

It will be understood that not all the solenoids 307 will be actuated upon closing of the reed switch 373 but that only those solenoids 307 which receive a signal from the memory unit 25 will be actuated.

As indicated diagrammatically in FIGURE 12, coded information from the keyboards 24 is transmitted to the memory unit 25. Certain of this information is transmitted to the printing units 26 which subsequently print the coded information on the letters. Other information or signals pertinent to the five presort groups are transmitted by the memory unit 25 to certain preselected ones of the solenoids 307 so that each letter will be kicked-off at the correct time into the proper stacking conveyor 321 as determined by the closing of the reed switch 373.

The shingling or stacking action at the intersection of the downward conveyor run 344 and the strips or fingers 346 is shown in the diagrams of FIGURES 13–18. As will be seen, the letters L are shingled sequentially and in order, although they are of various widths. An entering letter cannot enter between a pair of standing letters, even though the nearest letter is narrower (vertically shorter) than the next. The diagrams of FIGURES 13 to 18 illustrate the action.

In FIGURE 13 a bucket 326a has just brought a wide letter L1 onto the platform fingers 346. The bucket 326a continues on, leaving L1 depositing L1 on the platform.

In FIGURE 14, the lower edge of letter L1 has slid along 346, 346a (phantom to full line position), and rests against the abutment 354. The bucket 326a is sliding along the upper edge of L1.

In FIGURE 15, the trailing edge 324a of the bucket 326a and the ledge 324b of the next upstream bucket 326b have slid down under the upper edge L1. Since the edge 324a is outward of the ledge 324b, there is no catching against L1 at the articulation zones.

In FIGURE 16, a narrower letter L2 on bucket 326b is sliding down behind the upper edge of L1. It will be seen that the letter L2 is positively inserted behind the wider letter L1, without hang-up.

In FIGURE 17, the articulation zone between buckets 326b and 326c has slid behind L2 and L1, leaving L2 on the platform, behind L1.

In FIGURE 18, the letter L3, which was on bucket 326c, has been left on the platform fingers 346 and its lower edge has slid down against the abutment 354. L3 now rests against and behind L2. The lower edge of L1 has been urged up and over the abutment 340, and now rests against the abutment 356. A letter L4 on bucket 326d is sliding down behind the letter L3. Thus shingling or stacking continues without interference and hang-up for various width letters. As the stack progresses, the tray fills, and the conditions shown in FIGURE 8 result.

Although a system for the sorting of letters has been described, it is to be understood that other relatively flat articles, such as file cards, punch cards, and checks may be processed through the sorting and stacking apparatus of the system.

Having thus described the present invention and the manner in which the same is to be used so that those skilled in the art may practice the same, we claim:

1. Apparatus for sorting and stacking thin, flat articles such as letters, comprising a plurality of article transport conveyors running side by side, an endless stacker conveyor having an article receiving run beneath said transport conveyors and a downwardly inclined discharge run, said stacker conveyor comprising a longitudinal row of articulated buckets, means for transferring articles from said transport conveyors to the buckets on said article receiving run, article receiving and stacking means comprising article receiving plate means diverging downwardly from said downwardly inclined stacker conveyor discharge run, means for discharging articles one by one from the buckets on said discharge run to said plate means, abutment means on said plate means and facing said buckets for initially restraining the leading lower edges of recently discharge articles, and receiving means for discharged and shingled articles including article stacking and restraining wall means downstream of said abutment means.

2. The apparatus of claim 1, wherein said article discharging means comprises interdigitated means.

3. The apparatus of claim 1, wherein means are provided for synchronizing the transfer of letters from said transport to said stacker conveyors to insure the correct transfer of the articles to said buckets.

4. Apparatus for stacking thin, flat articles such as letters, comprising an endless conveyor having a generally horizontal article receiving run and a downwardly inclined article discharge run, said conveyor comprising a longitudinal row or articulated article buckets, said buckets having laterally spaced article support strips, said strips having article supporting faces inclined toward the path of said conveyor in the direction of travel, said buckets also providing laterally spaced article supporting ledge strips at the articulations and aligned with said support strips, said ledge strips extending generally normal to the path of said conveyor, article receiving and stacking means comprising article receiving plate means diverging downwardly from said conveyor discharge run, said plate means having article combing fingers projecting between bucket strips, abutment means on said plate means and facing said buckets for initially restraining the leading lower edges of recently discharged articles, the articulated portions of said buckets sliding under the upper edges of recently discharged articles supported on said plate means and temporarily holding them clear of approaching articles to provide interference-free shingling, and receiving means for discharged and shingled articles including letter stacking and restraining wall means downstream of said abutment means.

5. The apparatus of claim 4, wherein said article receiving means comprises a removable tray having an open upper end and having a floor that receives articles from said plate means.

6. The apparatus of claim 4, wherein a retractable article abutment is mounted between said abutment means and the upper end of said tray.

7. The apparatus of claim 4, wherein means are provided to vibrate said plate means and said tray.

8. In an apparatus for handling data bearing articles such as letters, the combination of a continuously driven conveyor, a plurality of evenly spaced article receiving buckets on said conveyor, a continuously driven elongated roller disposed above said conveyor, means for supporting an article in an inclined position above said conveyor and below said roller, said support means providing an opening therethrough, means for advancing an article along said support means into position over said opening and between said roller and said conveyor, kick-off means movable from a retracted position disposed below said support means to a kick-off position projecting through said opening and forcing the article against said continuously driven roller whereby said roller will engage and drive the article out of said support means and into one of said buckets, and means for actuating said kick-off means in timed relation with the movement of said conveyor.

9. The apparatus of claim 8, wherein said article advancing means comprises an endless band having a reach beneath said support means, said support means having an opening extending along said run, and article pusher lugs on said band projecting up through the opening in said support means.

References Cited

UNITED STATES PATENTS

| | | | |
|---|---|---|---|
| 2,141,883 | 12/1938 | Simmons | 198—156 |
| 2,571,840 | 10/1951 | Curlee | 214—7 |
| 2,596,228 | 5/1952 | Fletcher | 214—7 X |
| 2,663,403 | 12/1953 | Sindzinski | 214—11 X |
| 3,084,783 | 4/1963 | Morton et al. | 214—7 X |
| 3,100,040 | 8/1963 | Kleist | 214—11 X |

HUGO O. SCHULZ, *Primary Examiner.*

R. J. SPAR, *Assistant Examiner.*